June 8, 1948.  H. P. STAUDINGER ET AL  2,442,940
PROCESS FOR MAKING SHAPED POROUS MASSES OF
THERMOPLASTIC SYNTHETIC RESINOUS MATERIALS
Filed June 1, 1945
FIG. I
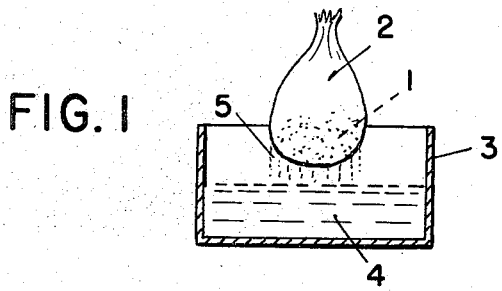
FIG. II
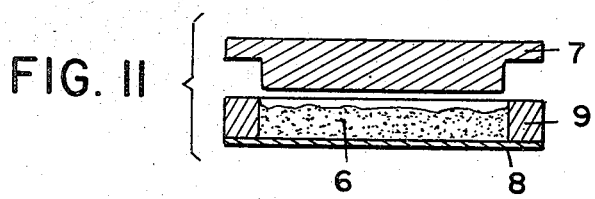
FIG. III
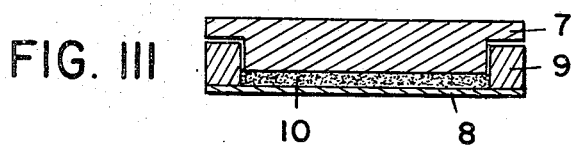
FIG. IV
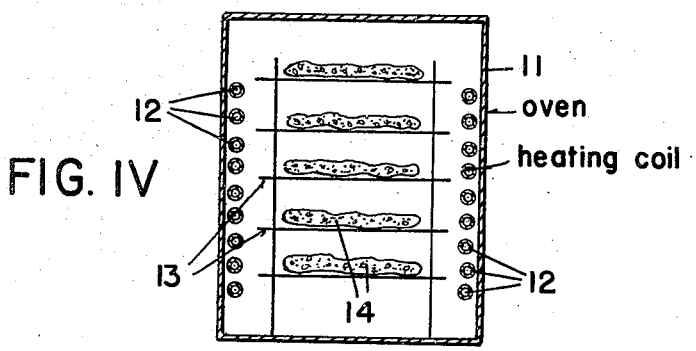
FIG. V
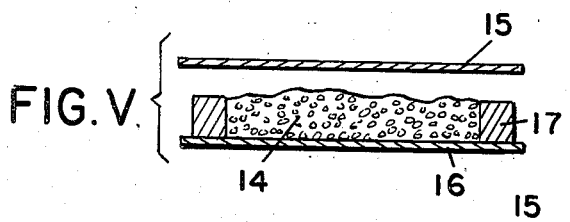
FIG. VI
Inventors
Hanns Peter Staudinger,
Brendan Kevin Kelly,
Alfred Cooper,
By  C. F. Wenderoth
Attorney Patented June 8, 1948

2,442,940

UNITED STATES PATENT OFFICE 2,442,940

PROCESS FOR MAKING SHAPED POROUS MASSES OF THERMOPLASTIC SYNTHETIC RESINOUS MATERIALS

Hanns Peter Staudinger, Ewell, Brendan Kevin Kelly, Wimbledon, London, and Alfred Cooper, Sanderstead, England, assignors of one-half to The Distillers Company, Limited, Edinburgh, Scotland, a British company, and one-half to The Expanded Rubber Company Limited, Croydon, England, a British company Application June 1, 1945, Serial No. 597,156
In Great Britain April 17, 1944

Section 1, Public Law 690, August 8, 1946
Patent expires April 17, 1964

13 Claims. (Cl. 18—47.5)

This invention is for improvements in or relating to the manufacture of expanded thermoplastic compositions and has for an object to produce a product of low density.

A number of methods have been proposed in the past for the production of expanded thermoplastic materials from material in massive form i. e. in the form of solid blocks or sheets. Some of these methods have depended upon the incorporation and decomposition of a chemical substance, capable of forming gases, in the thermo-plastic material, the incorporation and reaction of two or more chemical substances to form gases or the volatilisation or vaporisation of a chemical substance, usually a liquid or solvent, under the influence of heat and/or pressure.

According to the present invention there is provided a process for the manufacture of expanded thermo-plastic synthetic resinous material which comprises immersing the thermoplastic material, in the form of discrete particles, in a volatile non-solvent liquid as hereinafter defined, removing the excess liquid from the particles, shaping the wet particles in a mould to produce a blank which is a miniature of the final article, subjecting the wet particles in the mould to a heat treatment sufficient only to effect a sintering of the particles, cooling the blank and thereafter removing it from the mould and subjecting it to a heat treatment at a temperature at which the thermo-plastic material is plastic and the volatile liquid is vaporised whereby the thermo-plastic material is expanded. The process of the present invention differs from previously known practice in that it depends entirely upon the use of the thermo-plastic material in powdered or finely divided form, e. g. in the form of a moulding powder of any convenient size, usually between 10 and 200 mesh per linear inch, depending on the cell size required. This process is particularly applicable to polystyrene, styrene copolymers, acrylic polymers and cellulosic plastics although it is in no way limited to these.

By the expression "volatile non-solvent liquid" is meant a liquid which can be vaporised at a temperature at which the thermo-plastic material to be treated is plastic, said temperature being below the temperature of decomposition of said thermo-plastic material, the liquid preferably has a boiling point between 40° C. and 140° C.

A feature of the invention consists in that a minor proportion of a volatile solvent liquid is added to said non-solvent liquid; the use of the mixture of non-solvent and solvent liquids has the effect of making the absorption of the non-solvent liquid by the thermo-plastic material more rapid.

The moulding powder is soaked in the liquid, the excess liquid removed and the powder is then compacted together by pressure, allowed to expand freely and then pressed to give a standard moulding. A great advantage of this process lies in the fact that expanded thermo-plastic materials can be produced direct from the moulding powder without first preparing a dough or a sheet by milling, calendering, casting or block slicing.

Where it is desired to form expanded moulded articles of accurate dimensions it is necessary to subject the expanded blank to a further moulding operation and, accordingly, a feature of the invention therefore comprises expanding a thermo-plastic blank to a size greater than the size of the finished article and subjecting it to a finishing moulding operation to reduce it to the required size.

The invention may be termed a four-stage process consisting of the following stages:

(1) Immersion or soaking,
(2) Preparation of the blank,
(3) Expansion,
(4) Finishing operation or pressing.

These will now be described in further detail, reference being made in this regard to the accompanying sheet of drawings, wherein:

Fig. I shows diagrammatically the stage 1 procedure of soaking the moulding powder;

Figs. II and III show the preliminary moulding stage in a mould of the picture-frame type;

Fig. IV shows the expansion stage 3, and

Figs. V and VI illustrate the final moulding stage.

*First stage.*—The moulding powder of the chosen mesh, which may be enclosed in a muslin bag or wire cage, is immersed in the liquid consisting of one or more non-solvents or mixtures of these with a solvent for the particular thermo-plastic material. Thus, for example, it is possible to use petroleum ether of a boiling point range of 80°/100° C. as the non-solvent and acetone, ethyl acetate or benzene as solvents in an amount of 1–10 per cent by volume of the liquid mixture. Alternatively, petroleum ether of a boiling point range of 40° C./60° C. alone, or a mixture of petroleum ether of a boiling point range of 40° C./60° C. and petroleum ether of a boiling point range of 60°/80° C. can be used, these being non-solvents. During this soaking period the moulding powder takes up the liquid without dissolving in it. The presence of a small quantity of solvent aids the more rapid absorption of non-solvent liquid. The time of soaking is immaterial provided the moulding powder becomes saturated with the volatile liquid at room temperature, that is to say 20° C.+5° C. The time required to reach saturation depends to a certain extent on the particle size and may range from ½-hour to 12 hours. The powder is then removed from the liquid which is allowed to drain off for a few minutes ready for the second stage. It is an important part of the invention that up to this point the thermo-plastic remains in the form of discrete particles and is not, as has been the case in previously described processes, in the form of a coherent mass e. g. a dough.

In Fig. I of the drawings, the powdered moulding material 1 is shown enclosed in the muslin bag 2 suspended above a bath 3 containing the volatile liquid 4, excess liquid draining from the bag as shown at 5.

*Second stage.*—This consists in preparing a blank, in other words compacting the powdered material together to the approximate shape of the finished article, although only $\frac{1}{10}$ or $\frac{1}{20}$ of its ultimate volume, depending upon the desired final density. Thus, for example, in the manufacture of an expanded thermoplastic material to be used for thermal insulation boards, the wet powder may be placed in a small picture-frame type mould having a top and bottom plate. The mould is completely filled with a slight excess of the wet powder and is placed between the platens of a heated press and given a short heating treatment at elevated temperature for a few minutes, such as, for example, 2 minutes per ¼-inch thickness. During this treatment, the individual particles of the moulding powder partly unite or cohere in such a manner that a blank or pre-shape is formed suitable for the further treatment. The mould is cooled before the blank is removed.

In Fig. II of the drawings, the moistened powder 6 is shown disposed between the top and bottom of plates 7 and 8 respectively of a picture-frame mould, the side members of which are indicated at 9; Fig. III shows the mould in the closed position, the moulded blank being indicated by the numeral 10.

*Third stage.*—The actual expansion occurs at this stage of the process which consists in placing the blank on a metal or other type of grid or open shelf in a heated oven for ½- to 1-hour depending upon the desired final thickness. The temperature of the oven should preferably be between 60° and 120° C. in the case of polystyrene according to the density required. Thus, for example, 80° C. may be used to give a product weighing approximately 6 lbs. per cubic foot, whilst 100° C. may be used to give a product weighing 2–3 lbs. per cubic foot.

The conditions in the oven may be varied as to both the time and the temperature of treatment, for example, the blank may be heated at the lower temperatures of the range given for a longer period of time or it may be heated at a higher temperature for a shorter period of time. In the production of an expanded polystyrene product, for example, instead of using a temperature of 100° C. for a half hour to an hour as referred to above, the blank may be heated to about 80° C. for a period of 48 hours and the final product obtained will weigh from 2 to 3 pounds per cubic foot.

It will, of course, be appreciated that the times and temperatures to be used in this stage will depend upon the properties of the particular thermo-plastic synthetic resinous material being used and that the figures given above refer only to the treatment of an unplasticised polystyrene. The necessary conditions for the different thermo-plastic synthetic resinous materials, such as a plasticised polystyrene, a styrene-methylmethacrylate copolymer or polymethyl-methacrylate, can readily be ascertained by simple trial and experiment.

Fig. IV shows, conventionally an oven 11 provided with heating coil 12 and trays 13 on which are seen the expanded blanks 14; these expanded blanks 14 are obtained by the expansion of the blanks 10 shown in Fig. III; this figure (IV) is illustrative of stage 3 of the process.

*Fourth stage.*—The final stage of operation consists in moulding the expanded material to the desired accurate shape. When the expanded product is removed from the heated oven the material has an irregular surface and area. For commercial purposes it is necessary to produce an article of pre-determined and accurate dimensions. This is possible only by the additional operation of pressing which consists in placing the expanded thermo-plastic material in a large picture-frame mould with top and bottom plates in the daylight of a press where it is heated at 110/120° C. for a short period, depending upon the thickness, thus, for example, 15 minutes for ½-inch thickness or ½-hour for 1-inch thickness, followed by a cooling of the press before the material is extracted.

Fig. V shows the expanded blanks 14 lying between the top and bottom plates 15 and 16 respectively of a second picture-frame mould of which the side member is indicated by the reference numeral 17 and Fig. VI shows the final stage whereby the expanded blank is shaped by closing the top and bottom plates 15 and 16 of the picture-frame mould with the production of the finally shaped article 18, these two figures illustrating the final, i. e. the fourth stage of the process.

When treating the more highly expanded products, care must be taken to control the temperature conditions to ensure that on the one hand, the temperature is high enough to soften the product so that it may be compressed without being crushed and, that on the other hand, the temperature is not so high as to cause the individual cells to burst leading to shrinkage of the product. For example, the temperature range for pressing expanded polystyrene weighing 2 to 3 pounds per cubic foot should be from about 95° to 105° C. In illustration of the treatment of such a product it may be stated that the expanded polystyrene is placed between the platens of a steam-heated press and, instead of using a picture-frame mould, distance bars are inserted between the platens so as to allow the expanded material freedom of movement during the pressing operation.

Steam is then blown through the press at a pressure of one to two pounds per square inch, the outlet being open, for about fifteen minutes in order to ensure that the platens are uniformly heated and that the expanded polystyrene is thoroughly warmed. The press is then closed on to the distance bars, the steam turned off and cooling water is then circulated through the press to cool the platens and the pressed sheet is removed from the press only after it has been cooled to well below its softening point.

We have found that we can produce coloured products by incorporating in the volatile non-solvent liquid, or in the solvent added thereto, a dyestuff which is soluble therein; for example, by adding a petroleum-ether-soluble black dyestuff to the petroleum-ether so that the polystyrene to be expanded contains about 2% by weight of the black dyestuff, the final expanded product is coloured deep black and has a lower thermal conductivity than the corresponding uncoloured product, presumably due to the fact that the transmission of heat rays through the material is reduced. Other dyestuffs may be used to produce products of different colours and by mixing batches of differently coloured soaked particles variegated products can be produced which are particularly suitable for decorative purposes.

Although the above process lends itself particularly to the manufacture of thermal insulation boards in which it is desired to have small independent cellular structure, it is not confined to this type of product. The process can be applied equally well to the manufacture of various types of articles for decorative and other uses, in which case the preform is made to the approximate outline of the finished product which is moulded in a closed mould designed for the purpose.

What we claim is:

1. A process for the manufacture of shaped masses of thermoplastic synthetic resinous material consisting substantially wholly of individual thin-walled cells which comprises wetting the thermoplastic material, in the form of discrete particles, with a non-solvent liquid wholly vapourisable at a temperature below the softening point of said thermoplastic material and capable of wetting said thermoplastic material, removing any excess liquid from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rupture of the individual cells thereof and continuing said heating until substantially the whole of said non-solvent liquid has vapourised from the product.

2. A process for the manufacture of shaped masses of thermoplastic synthetic resinous material consisting substantially wholly of individual thin-walled cells which comprises wetting the thermoplastic material, in the form of discrete particles, with a non-solvent liquid wholly vapourisable at a temperature between 40° C. and 140° C. and capable of wetting said thermoplastic material, removing any excess liquid from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rupture of the individual cells thereof and continuing said heating until substantially the whole of said non-solvent liquid has vapourised from the product.

3. A process for the manufacture of shaped masses of thermoplastic synthetic resinous material consisting substantially wholly of individual thin-walled cells which comprises wetting the thermoplastic material, in the form of discrete particles with a petroleum ether boiling within the limits of 40° C. and 100° C., removing any excess petroleum ether from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rupture of the individual cells thereof and continuing said heating until substantially the whole of said petroleum ether has vapourised from the product.

4. A process for the manufacture of shaped masses of thermoplastic synthetic resinous material consisting substantially wholly of individual thin-walled cells which comprises wetting the thermoplastic material, in the form of discrete particles with a petroleum ether boiling within the limits of 40° C. and 60° C., removing any excess petroleum ether from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rutpure of the individual cells thereof and continuing said heating until substantially the whole of said petroleum ether has vapourised from the product.

5. A process according to claim 1 wherein the sintered blank is expanded to a size greater than the required size of the final product and the oversized blank is subjected to a finishing moulding operation at a temperature high enough to soften the thermo-plastic material but insufficient to cause the individual cells to rupture to reduce the blank to the required size.

6. A process for the manufacture of shaped masses of thermoplastic synthetic resinous material consisting substantially wholly of individual thin-walled cells which comprises wetting the thermo-plastic material, in the form of discrete particles, with a liquid mixture which is wholly vapourisable at a temperature below the softening point of said thermoplastic material and capable of wetting said thermoplatic material, said liquid mixture comprising essentially a non-solvent for said thermo-plastic material and a minor proportion of a solvent, removing any excess liquid mixture from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rupture of the individual cells thereof and continuing said heating until substantially the whole of said liquid mixture has vapourised from the product.

7. A process for the manufacture of shaped masses of thermoplastic synthetic resinous material consisting substantially wholly of individual thin-walled cells which comprises wetting the thermo-plastic material, in the form of discrete particles, with a liquid mixture which is wholly vapourisable at a temperature below the softening point of said thermoplastic material and capable of wetting said thermoplastic material, said liquid mixture comprising essentially a non-solvent for said thermoplastic material and from 1% to 10% by volume of a solvent, removing any excess liquid mixture from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the thermoplastic material is softened and expands to a substantially cellular product without rupture of the individual cells thereof and continuing said heating until substantially the whole of said liquid mixture has vapourised from the product.

8. A process according to claim 7 wherein said solvent is acetone.

9. A process according to claim 7 wherein said solvent is ethyl acetate.

10. A process according to claim 7 wherein said solvent is benzene.

11. A process for the manufacture of shaped masses of thermoplastic synthetic resinous material consisting substantially wholly of individual thin-walled cells which comprises wetting the styrene, in the form of discrete particles with a petroleum ether boiling within the limits of 40° C. and 60° C., removing any excess petroleum ether from the wetted discrete particles, shaping the wetted discrete particles in a mould to produce a blank which is a miniature of the desired final shaped mass, heating the wetted discrete particles in the mould at a temperature sufficient only to effect a sintering thereof, cooling the sintered blank and removing it from the mould, heating the sintered blank to a temperature at which the styrene is softened and expands to a substantially cellular product without rupture of the individual cells thereof and continuing said heating until substantially the whole of said petroleum ether has vapourised from the product.

12. A process according to claim 1 wherein a minor proportion of a volatile solvent liquid is added to said non-solvent liquid.

13. A process according to claim 1 wherein a dyestuff is dissolved in said nonsolvent liquid.

HANNS PETER STAUDINGER.
BRENDAN KEVIN KELLY.
ALFRED COOPER.

REFERENCES CITED

The following references are of record in the file of this patent:

UNITED STATES PATENTS

| Number | Name | Date |
| --- | --- | --- |
| 2,218,385 | Schulze | Oct. 15, 1940 |
| 2,297,248 | Rudolph | Sept. 29, 1942 |
| 2,318,385 | Schulze | Oct. 15, 1940 |
| 2,371,868 | Berg et al. | Mar. 20, 1945 |
| 2,384,387 | Meyer | Sept. 4, 1945 |
| 2,405,345 | Cooper et al. | Aug. 6, 1946 |